(12) United States Patent
Gray

(10) Patent No.: US 6,745,477 B2
(45) Date of Patent: Jun. 8, 2004

(54) DEBONING KNIFE

(76) Inventor: Dale Gray, P.O. Box 22, Huntington, AR (US) 72940

(*) Notice: Subject to any disclaimer, the term of this patent is extended or adjusted under 35 U.S.C. 154(b) by 57 days.

(21) Appl. No.: 09/947,835

(22) Filed: Sep. 5, 2001

(65) Prior Publication Data

US 2002/0046467 A1 Apr. 25, 2002

Related U.S. Application Data

(60) Provisional application No. 60/229,810, filed on Sep. 5, 2000.

(51) Int. Cl.[7] ................................................. A26B 3/04
(52) U.S. Cl. ........................ 30/304; 452/135; 452/137
(58) Field of Search ......................... 30/304, 305, 114; 452/135, 137

(56) References Cited

U.S. PATENT DOCUMENTS

| 939,846 | A | | 11/1909 | Matthews |
|---|---|---|---|---|
| 1,847,062 | A | | 2/1932 | Lemmon |
| 2,013,902 | A | | 9/1935 | Tarrant |
| 2,142,197 | A | | 1/1939 | Lee |
| 2,335,013 | A | | 11/1943 | Kennett |
| 2,793,392 | A | * | 5/1957 | Cutrera ........................ 452/137 |
| 3,347,680 | A | | 10/1967 | Rambold |
| 4,557,017 | A | | 12/1985 | Gasbarro |
| 4,969,267 | A | | 11/1990 | Anenberg |
| 5,447,516 | A | | 9/1995 | Gardner |

* cited by examiner

Primary Examiner—Douglas D. Watts
(74) Attorney, Agent, or Firm—Boyd D. Cox

(57) ABSTRACT

A cutting tool and method for removing the tenders from a poultry carcass wherein the cutting tool is a deboning knife having a pair of blades attached to a handle in a side by side relation with a distance therebetween. The surfaces of the blades include undulations for accommodating the curvature of the keel from which the tenders are removed. The method for removing the tenders comprises manual manipulation of the deboning knife to simultaneously remove two tenders from the carcass.

13 Claims, 3 Drawing Sheets

DEBONING KNIFE

Priority for this application is claimed from U.S. Provisional Application No. 60/229,810 entitled "Tender Knife" filed on Sep. 5, 2000.

BACKGROUND

The present invention is directed to a cutting tool for removing the tenders from a poultry carcass and a method for removing the tenders from the carcass. More particularly, the cutting tool is a deboning knife that slices the tenders from the keel. The deboning knife includes a plurality of blades that simultaneously remove both the left and right tenders with a single stroke of the knife.

The tender is a small strip of meat situated beneath the breast portion and adjacent to the keel on a bird. One tender is located on each side of the keel. When deboning a carcass, the tenders are generally removed after the breast portion and the wings have been cut away from the carcass shell.

Removing the tender can be difficult due to its size and shape, and its close attachment to the keel. Both manual and automated means are known in the art for separating the tenders from the carcass.

When the tenders are removed manually from a carcass, a cutting tool such as a knife is generally used. Typically, the method for manually removing the tenders from a keel comprises slicing a first tender away from the carcass, then slicing the second tender away from the carcass. By running the knife blade under the first tender and down one side of the keel the tender is separated from the keel. The same process is repeated to release the second tender from the carcass. Severing the tenders from the carcass in separate cutting actions can double the amount of time required to remove the tenders from the carcass. Such inefficiency slows production and increases the cost of producing poultry products.

Furthermore, conventional knife blades generally have flat, planar surfaces. Since the keel is curvilinear, the planar blade fails to accommodate the shape of the keel and unwanted waste is left on the carcass after the cutting process is completed. Therefore conventional knives are unable to effectively separate the tender from the keel. In some situations, the knife blade can be repeatedly repositioned during use to better accommodate the shape of the keel. However, such a means of removing the tender requires more user time and skill.

While automated means for removing the tenders from poultry carcasses are known, such machines generally cause extensive damage to the carcass, thereby producing less than satisfactory results. In addition, automated means are not exacting in their removal of the meat and the amount of waste created is typically greater than that resulting from manual removal.

For the foregoing reasons, there is a need for a deboning knife and method for removing both tenders of a poultry carcass simultaneously in order to reduce the time required to process poultry. An additional need exists to provide a knife and method for removing tenders that reduces waste and inhibits damage to the resulting carcass shell.

SUMMARY

The present invention is directed to a cutting tool and method for removing the tenders from a poultry carcass. The cutting tool comprises a deboning knife having a cutting means which include a plurality of spaced apart blades arranged in side by side relation.

The cutting edges of the blades are aligned with each other. Each of the blades is bow shaped and includes undulations along the surfaces thereof to allow each blade to follow the curvature of the keel during use. To remove the tenders with the deboning knife of the present invention, the pointed tips of the blades are positioned proximate the upper end of the keel, generally between the tender and the wishbone. The knife is inserted at that location with a respective blade entering the carcass on each side of the keel. Drawing the blades along the keel toward the carcass cavity simultaneously cuts both of the tenders away from the carcass.

It is an object of the present invention to provide a knife that can simultaneously remove at least both tenders from a poultry carcass.

It is a further object of the present invention to provide a method for simultaneously removing at least both tenders from a poultry carcass.

It is a further object of the present invention to provide a knife for removing poultry tenders that reduces the amount of waste left on the carcass.

It is a further object of the present invention to provide a knife that reduces the time required to remove the tenders from a poultry carcass.

It is a further object of the present invention to provide a method for removing tenders that reduces the time required to remove the tenders from a carcass.

It is a further object of the present invention to provide a knife that can quickly and efficiently remove the tenders from a poultry carcass.

It is a further object of the present invention to provide a fast and efficient method for removing the tenders from the carcass of a bird.

It is a further object of the present invention to provide a cutting tool and method for removing poultry tenders from a carcass in which damage to the carcass shell is significantly reduced.

BRIEF DESCRIPTION OF DRAWINGS

Reference is made to the accompanying drawings in which are shown illustrative embodiments of the invention and from which novel features and advantages will be apparent.

DETAILED DESCRIPTION

The present invention is a cutting tool and method for removing the tenders from a poultry carcass.

Figure 1:
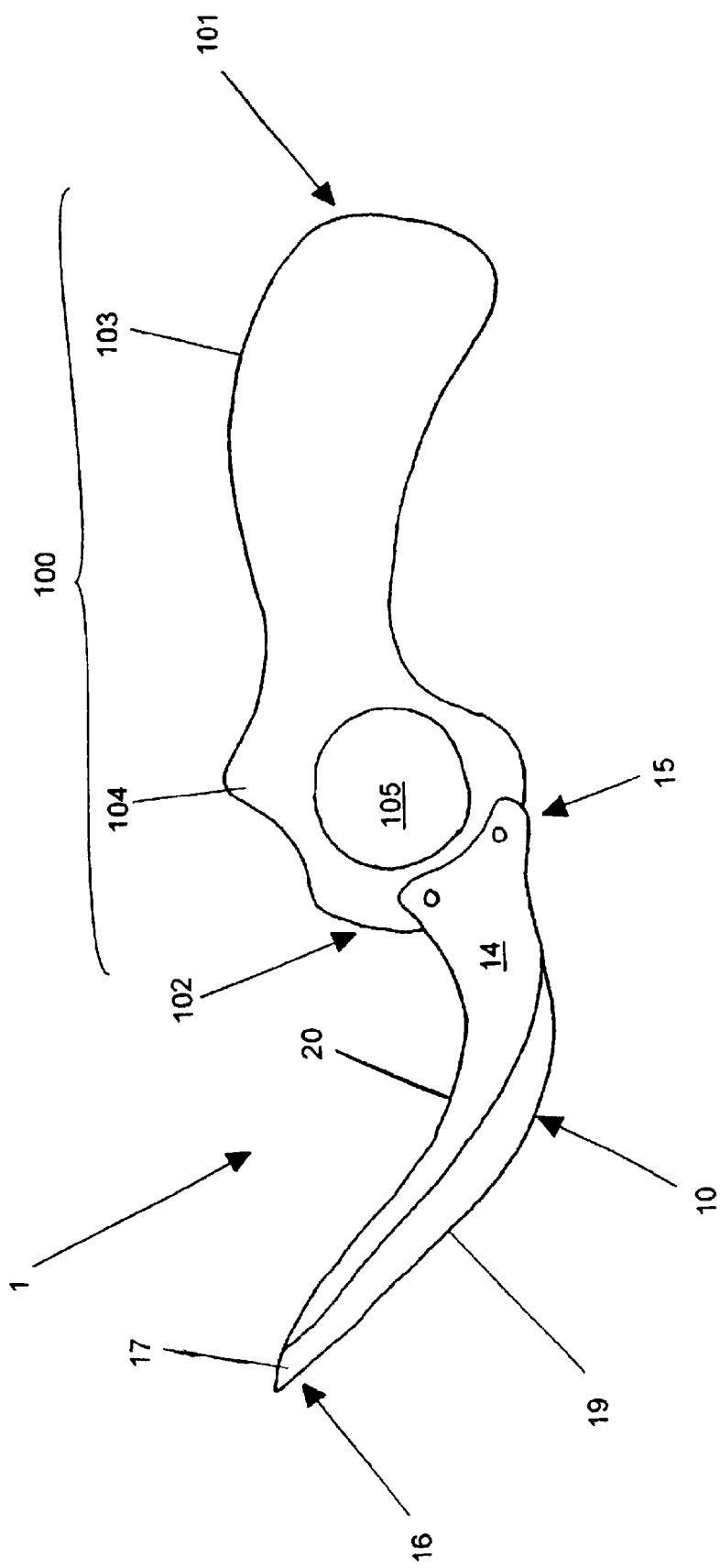
FIG. 1 is a side view of the deboning knife of the present invention.
Figure 2:
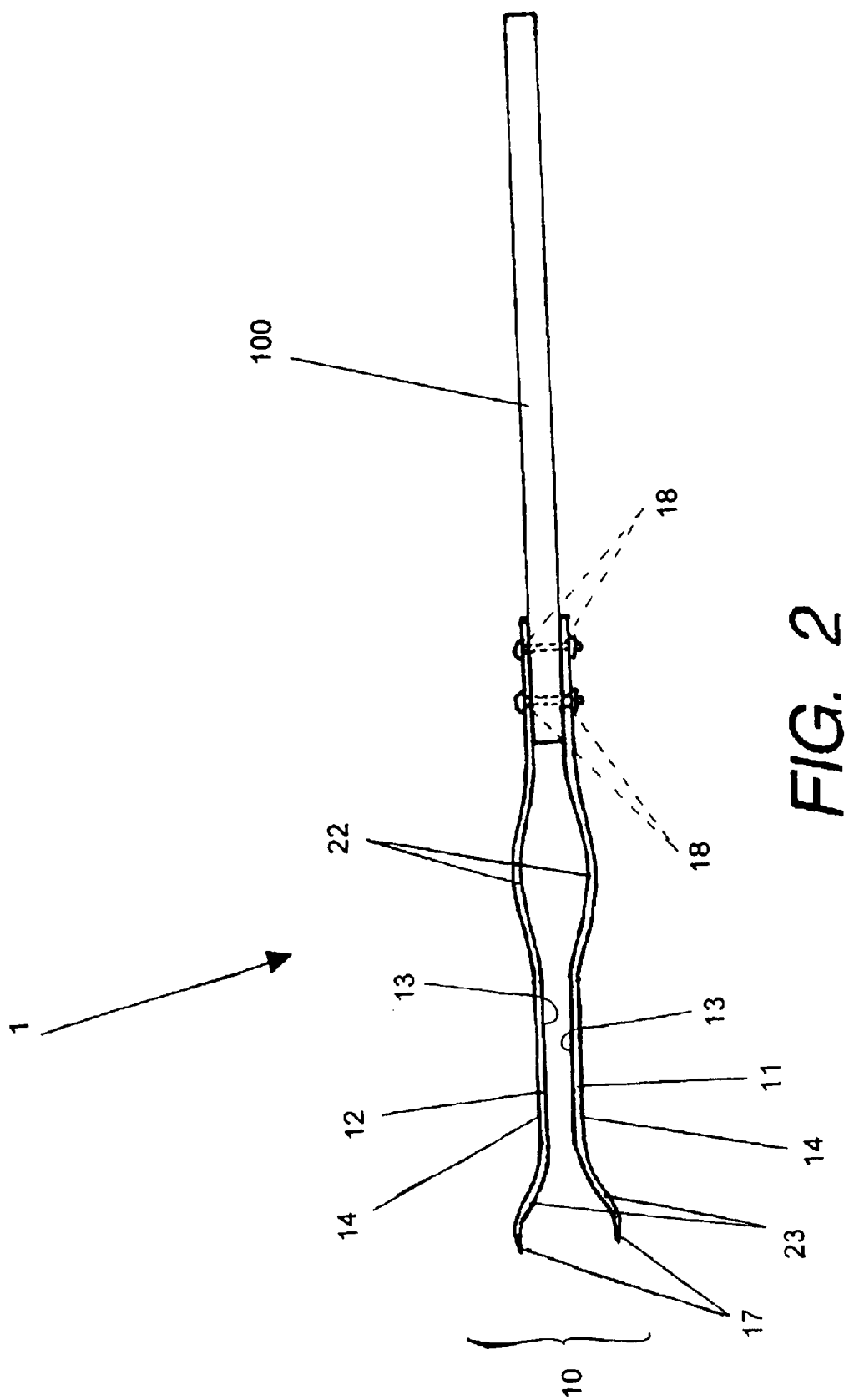
FIG. 2 is a top view of the deboning knife in FIG. 1.
Figure 3:
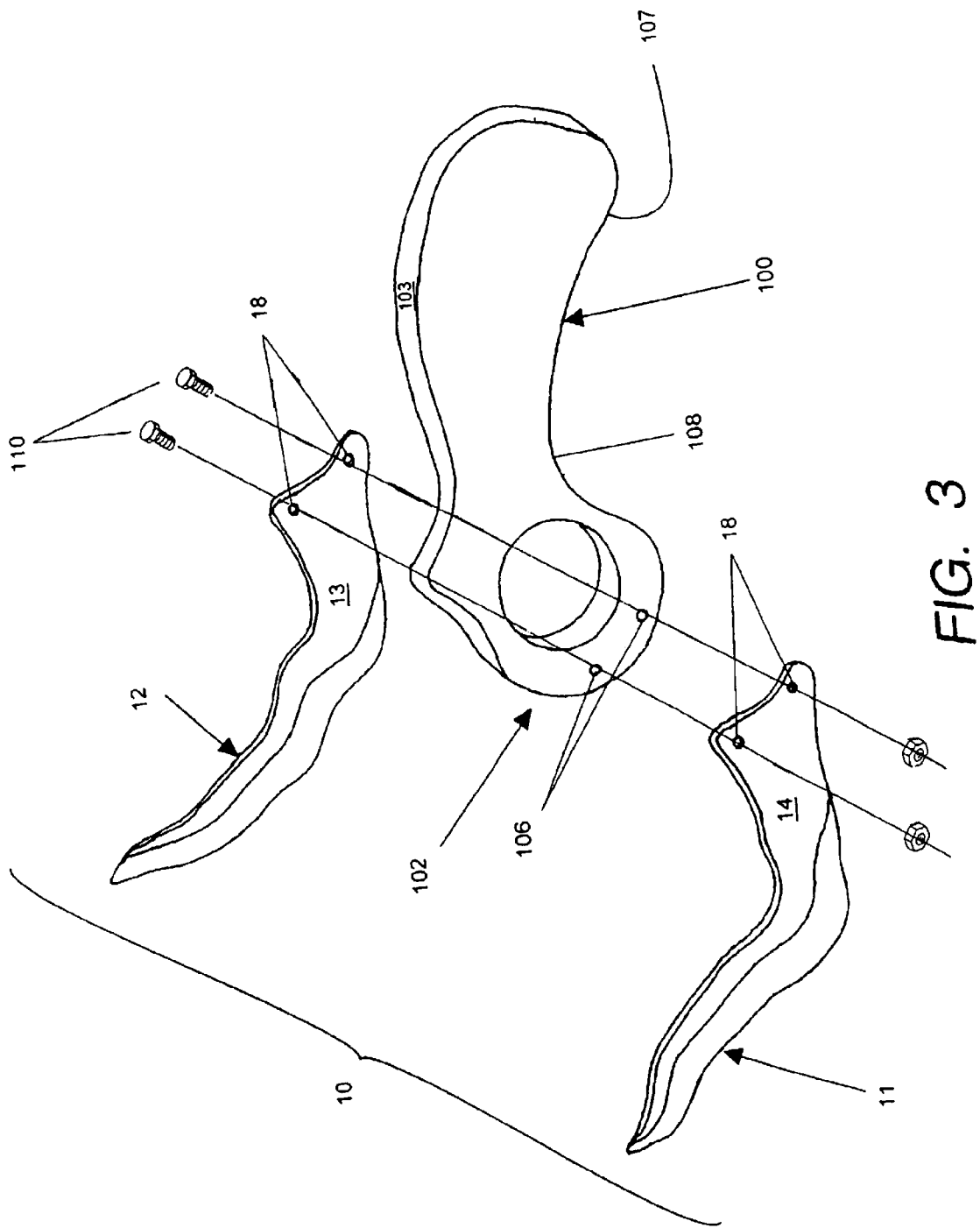
FIG. 3 is an exploded perspective view of the deboning knife in FIG. 1.

Referring to FIGS. 1, 2 and 3, there is shown the cutting tool of the present invention comprising a deboning knife (1) having a means for cutting. The means for cutting is a cutting element (10) which is comprised of a plurality of blades. The plurality of blades includes a left blade (11) and a right blade (12).

The deboning knife (1) also comprises a means for holding the cutting element which is attached to the cutting means by a securing means. The means for holding the cutting element is a handle (100).

Each of the left (11) and right (12) blades is elongated and includes an inner side surface (13) and an outer side surface

(14) and a proximal end (15) and a distal end (16). A pointed tip (17) is provided on the distal end (16) of each blade (11, 12) and a plurality of holes (18) extends through each respective proximal end (15) thereof. Edges surrounding each of the blades (11, 12) include a first edge (19) being sharpened for cutting and a second edge (20) disposed generally opposite to the first edge (19). The cutting element (10) including both blades (11, 12) has a width that extends between the outer side surfaces (14) of the left (11) and right (12) blades.

The handle (100) has a free end (101) and an attaching end (102), the latter of which is secured to the cutting element (10) by the securing means. An upper edge (103) of the handle (100) includes a protrusion (104) while a lower edge (107) includes an indentation (108) therein, both of which assist the user to grip the handle (100). The protrusion (104) is a thumb hold for pressing and guiding the knife (1) through the carcass during use. In addition, an aperture (105) extending through the handle (100) is positioned proximate the attaching end (102) of the handle (100) and provides a means for receiving a digit, such as the user's finger. The aperture (105) facilitates gripping and guiding of the deboning knife (1) particularly during use. A plurality of attaching holes (106) are disposed proximate the attaching end (102) of the handle (100) for receiving the securing means therethrough as shown in FIG. 3.

The securing means are pins (110) that attach the left (11) and right (12) blades of the cutting element (10) to the handle (100). The pins (110) comprise bolts and cooperating nuts. However, the pins (110) can alternately comprise screws, rivets or other suitable connectors instead of the cooperating nuts and bolts.

The cutting element (10) is shaped to straddle the keel of the poultry carcass and maintain a position proximate each side of the keel as the blades (11, 12) are drawn through the carcass. It should be understood that the left (11) and right (12) blades are of the same general size and shape, with the blades (11, 12) being a mirrored image of each other.

From the side view as shown in FIG. 1, the boning knife (1) is generally S-shaped. The blades (11, 12) are elongated having a bowed shape. Both the first (19) and second (20) edges are curvilinear and the first edge (19) is beveled to form a sharpened edge.

From the top view as shown in FIG. 2, the width of the cutting element (10) is shown to vary along its length which extends from the pointed tip (17) of the blades (11, 12) to the handle (100). Each blade (11, 12) of the cutting element (10) includes a plurality of bends which create undulations in the blades (11, 12). The undulations in the left (11) and right (12) blades nearest the handle (100) coincide to create a first enlarged portion (22) in the width of the cutting element (10). A second enlarged portion (23) is located adjacent to the pointed tips (17) at the blades' distal ends (16). Positioned between the first (22) and second (23) enlarged portions is a parallel portion (24) where the blades (11, 12) are substantially parallel to each other.

The depth of each blade (11, 12) generally decreases along the length of the respective blade (11, 12) from the proximal end (15) to the pointed tip (17). The pointed tips (17) of the respective left (11) and right (12) blades are generally parallel to each other.

The plurality of blades are preferably made of stainless steel and are rigid enough to resist deformation during use. Suitable metals may be substituted for stainless steel to fabricate the blades. The handle (100) is preferably made of plastic, but other suitable materials such as metals may be used instead.

The blades cut between the tender and keel to separate the meat from the carcass. In a preferred embodiment, the left blade (11) slices the left tender away from the respective side of the keel, as the right blade (12) slices the other tender away from the right side of the keel.

The attached handle (100) provides a hand grip with which the user can manipulate the cutting element (10). In addition, the handle (100) supports the left (11) and right (12) blades a predetermined distance apart.

The deboning knife (1) is sized and shaped to remove the tenders from a poultry carcass with a minimum amount of resultant waste. In a preferred embodiment, the overall length of the knife (1) is approximately 7¼ inches with the blades having an effective length of about 2⅞ inches. Proximate the handle (100), the inner side surfaces (13) of the left (11) and right (12) blades are spaced apart a distance of about 3/16 inches. The first enlarged portion (22) ranges in width from about 3/16 inches to a maximum of about ½ inches, while the second enlarged portion (23) ranges in width from about 3/16 inches to a maximum of about ⅝ inches. The parallel portion (24) has a width of approximately 3/16 inches and extends for about 1 inch along a length of the cutting element (10). On the distal end (16) of each blade (11, 12) the pointed tips (17) extend approximately ⅛ inches along the length of each respective blade and are disposed generally parallel to each other at a distance apart of about ⅝ inches. On the handle (100), the aperture (105) is sized to receive at least one finger therein and is about 1 inch in diameter.

In a preferred embodiment as shown in FIG. 1, the proximal end (15) of each blade (11, 12) is connected to the attaching end (102) of the handle (100) by securing means, such that the inner side surface (13) of the left blade (11) is disposed adjacent to one side of the handle (100) and the inner side surface (13) of the right blade (12) is disposed adjacent to an opposite side of the handle (100). The first edges (19) of the respective left (11) and right (12) blades are aligned with each other. Each hole (18) in the respective left (11) and right (12) blades (11, 12) are aligned with a respective attaching hole (106) of the handle (100). A pin (110) extends through respective aligned holes (18) on the blades (11, 12) and through respective aligned attaching holes (106) to secure the handle (100) and blades (11, 12) together as a unit.

On the handle (100), the protrusion (104) is disposed on the upper edge (103) while the indentation (108) is formed on the lower edge (107) thereof. The protrusion (104), the indentation (108) and the proximal ends (15) of the blades (11, 12) are positioned around the aperture (105) in the handle (100).

To use the deboning knife (1), the cutting element (10) is inserted into the upper end of a carcass preferably having had the breast and wings removed to expose the tenders on the keel. Using the handle (100) to manipulate the cutting element (10), the blades (11, 12) are moved through the carcass, slicing the tenders away from the keel.

Gripping the knife (1) with the handle (100), a user inserts the blades (11, 12) proximate the keel's upper end which is located nearer to the neck than the keel's lower end. The blades' pointed tips (17) are inserted into the carcass in an area approximately between the wishbone on the carcass and an upper edge of the respective tender with the pointed tip (17) of the left blade (11) positioned on one side of the keel and the pointed tip (17) of the right blade (12) positioned on the opposite side of the keel.

The cutting element (10) is inserted into the carcass so that the blades (11, 12) are straddling the keel, the first (22) and second (23) enlarged portions are generally aligned with the contours of the keel and the inner side surfaces of the blades are adjacent to and aligned with respective left and right sides of the keel. The knife's blades (11, 12) are drawn longitudinally down the carcass from the upper end to the lower end of the keel, thereby slicing the tenders away from each respective side of the keel. The blades (11, 12) are guided along the length of the keel as the knife (1) is moved through the carcass.

A preferred method for removing the tenders from a poultry carcass comprises the following steps of providing a deboning knife, positioning the knife on the upper end of the carcass and inserting the knife into the carcass at that location. Once the knife is inserted into the carcass, the steps include drawing the blades down the keel and separating the tenders from the carcass.

Specifically, this method comprises providing a deboning knife having a handle and a cutting element which includes a plurality of blades, wherein the plurality of blades include a left blade having a pointed tip and a right blade having a pointed tip, and the left and right blades having undulations therein for generally aligning with the contour of the keel of the carcass; positioning the knife on the poultry carcass at a location adjacent to an upper end of the keel such that the pointed tip of the left blade is disposed at an approximate position between the upper end of the tender and the wishbone on one side of the keel; and the pointed tip of the right blade is disposed at an approximate position between the upper end of the tender and the wishbone on the opposite side of the keel; and inserting the blades into the poultry carcass at those respective locations, wherein the pointed tip of the left blade penetrates the carcass on one side of the keel, and the pointed tip of the right blade penetrates the carcass on the opposite side of the keel. When the blades have been inserted into the carcass, the steps include drawing the left and right blades through the carcass in a generally straight direction along the keel from the upper end to the lower end thereof, guiding the blades along the keel, and separating the tenders from the carcass. Consequently, the left and right tenders are severed and removed from the carcass.

The step of drawing the left and right blades through the carcass further comprises slicing the left and right tenders away from the respective left and right sides of the keel with the respective left and right blades.

The deboning knife and the method for removing the tenders of the present invention can decrease the amount of time and effort required to remove the tenders from a poultry carcass, since both tenders can be severed from both sides of the keel simultaneously. Consequently, the present invention can significantly reduce the cost of poultry production. By maintaining close proximity to the keel during the tender cutting process, the present invention can reduce the amount of waste left on the carcass after processing is completed.

Although the present invention has been described in considerable detail with reference to certain preferred versions thereof, other versions are possible. Therefore, the spirit and scope of the appended claims should not be limited to the description of the preferred versions contained herein.

What is claimed is:

1. A cutting tool for removing the tenders from a poultry carcass, said cutting tool comprises:

a cutting element; and a handle attached to said cutting element, wherein said cutting tool is generally S-shaped;

said cutting element comprises left and right blades;

each of said left and right blades comprises first and second edges, inner and outer side surfaces, a proximal end attached to said handle, and a distal end having a pointed tip;

wherein said first edge of each left and right blade is sharpened for cutting, said left and right blades are positioned in side by side relationship with said inner side surface of the left blade facing toward said inner side surface of the right blade, and said outer side surface of the left blade facing away from said outer side surface of the right blade;

said cutting element further comprises a length and width, wherein said length is a distance along the cutting element extending from the pointed tips of the left and right blades to the handle, and said width extends between the outer side surfaces of the respective left and right blades; and the width varies along the length of the cutting element to include first and second enlarged portions on the cutting element, wherein said first enlarged portion is located along the length between the handle and the pointed tips, and the second enlarged portion is located at the pointed tips.

2. The cutting tool of claim 1, wherein said handle comprises an aperture for receiving a user's finger therethrough.

3. The cutting tool of claim 2, wherein said handle includes a thumb hold.

4. The cutting tool of claim 3, wherein said handle includes an indentation.

5. The cutting tool of claim 4, wherein said handle comprises an upper edge and an opposing lower edge, and said thumb hold comprises a protrusion on said upper edge.

6. The cutting tool of claim 5, wherein said indentation is disposed on said lower edge of the handle.

7. The cutting tool of claim 4, wherein said aperture is at least partially surrounded by said proximal ends of the left and right blades, said thumb hold, and said indentation.

8. The cutting tool of claim 1, wherein the left and right blades are spaced apart predetermined distances and said predetermined distances include a minimum predetermined distance of approximately ⅜ inches.

9. The cutting tool of claim 8, wherein the predetermined distances between the left and right blades include a maximum predetermined distance of approximately ⅝ inches.

10. The cutting tool of claim 1, wherein said first and second enlarged portions of the cutting element are formed by bends in the left and right blades.

11. The cutting tool of claim 1, wherein the poultry carcass has a keel with the tenders being disposed on a respective left and right side of the keel, and at least one of the enlarged portions generally conforms to the contours of the keel.

12. The cutting tool of claim 1, wherein each of the left and right blades is generally bow-shaped in profile.

13. The cutting tool of claim 1, wherein the left and right blades are rigid.

* * * * *